(12) United States Patent
Yan et al.

(10) Patent No.: US 10,523,112 B2
(45) Date of Patent: Dec. 31, 2019

(54) POWER CONVERTER AND METHOD OF CONTROLLING THE SAME

(71) Applicant: Delta Electronics (Shanghai) CO., LTD, Shanghai (CN)

(72) Inventors: Chao Yan, Shanghai (CN); Yiwen Lu, Shanghai (CN); Liping Sun, Shanghai (CN); Zhihui Ding, Shanghai (CN); Qi Huang, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 16/244,163

(22) Filed: Jan. 10, 2019

(65) Prior Publication Data

US 2019/0245432 A1    Aug. 8, 2019

(30) Foreign Application Priority Data

Feb. 5, 2018    (CN) .......................... 2018 1 0113319

(51) Int. Cl.
    *H02M 1/42*          (2007.01)
    *H02M 3/158*        (2006.01)
    (Continued)

(52) U.S. Cl.
    CPC ......... *H02M 1/4233* (2013.01); *H02J 7/0052* (2013.01); *H02M 1/08* (2013.01);
    (Continued)

(58) Field of Classification Search
    CPC ........ H02M 1/08; H02M 1/42; H02M 1/4208; H02M 1/4216; H02M 1/4225; H02M 1/4233; H02M 1/4241; H02M 1/4258; H02M 1/44; H02M 3/156; H02M 3/157; H02M 3/158; H02M 3/1584; H02M 3/1588; H02M 3/335; H02M 3/33507; H02M 3/33515; H02M 3/33523; H02M 3/3353;
(Continued)

(56) References Cited

U.S. PATENT DOCUMENTS

2012/0051096 A1*    3/2012    Kippley ............ H02M 3/33507
                                                                363/21.04
2012/0187847 A1*    7/2012    Hamamoto ........ H05B 33/0815
                                                                315/125

(Continued)

*Primary Examiner* — Gary L Laxton
*Assistant Examiner* — Ivan Laboy
(74) *Attorney, Agent, or Firm* — Yunling Ren

(57) ABSTRACT

A power converter and a method of controlling the power converter are provided. The power converter includes a PFC rectifier module and a DC-DC converter module. When the output voltage of the power converter is greater than or equal to a minimum limit value of the bus voltage output by the PFC rectifier module, the DC-DC converter module is operated in a constant-on mode in which the DC-DC converter module does not perform voltage conversion and the PFC rectifier module outputs the bus voltage which is adjusted according to the output voltage of the power converter. When the output voltage of the power converter is less than the minimum limit value, the DC-DC converter module is operated in a voltage-regulation mode in which the DC-DC converter module converts the bus voltage into the output voltage of the power converter, and the bus voltage is a constant value.

18 Claims, 12 Drawing Sheets

(51) Int. Cl.
*H02M 3/335* (2006.01)
*H02J 7/00* (2006.01)
*H02M 1/08* (2006.01)
*B60L 53/60* (2019.01)
*B60L 53/30* (2019.01)
*H02M 1/44* (2007.01)

(52) U.S. Cl.
CPC ..... *H02M 3/1588* (2013.01); *H02M 3/33576* (2013.01); *B60L 53/30* (2019.02); *B60L 53/60* (2019.02); *B60L 2210/12* (2013.01); *B60Y 2200/91* (2013.01); *B60Y 2300/91* (2013.01); *H02J 2007/0059* (2013.01); *H02M 1/44* (2013.01)

(58) Field of Classification Search
CPC ......... H02M 3/33538; H02M 3/33546; H02M 3/33553; H02M 3/33561; H02M 3/33569; H02M 3/33576; H02M 3/33584; H02M 3/33592; H02M 2003/1586; H02J 7/0052; H02J 2007/0059; B60L 53/20; B60L 53/22; B60L 53/30; B60L 53/60; B60L 2210/00; B60L 2210/10; B60L 2210/12; B60L 2210/14; B60L 2210/30; B60L 2210/40; B60L 2210/42; B60Y 2200/91; B60Y 2300/91

See application file for complete search history.

(56) References Cited

U.S. PATENT DOCUMENTS

| | | | |
|---|---|---|---|
| 2015/0054469 A1* | 2/2015 | Jang | B60L 11/1861 320/162 |
| 2015/0069953 A1* | 3/2015 | Seong | B60L 11/1812 320/107 |
| 2015/0171740 A1* | 6/2015 | Seong | H02M 1/4208 320/162 |
| 2016/0043634 A1* | 2/2016 | Bemat | H02M 1/4225 713/300 |

* cited by examiner

POWER CONVERTER AND METHOD OF CONTROLLING THE SAME

CROSS-REFERENCE TO RELATED APPLICATIONS

This application is based upon and claims priority to Chinese Patent Application No. 201810113319.3, filed on Feb. 5, 2018, the entire content of which is hereby incorporated by reference for all purposes.

TECHNICAL FIELD

The present disclosure relates to the field of circuits, more particularly, to a power converter and a method of controlling the same.

BACKGROUND

Due to advantages in terms of environmental protection, cleanliness, and saving energy, electric vehicles have been widely used during recent years. However, a main bottleneck in development of electric vehicles lies in batteries. In order to meet the demands in application of electric vehicles, a vehicle battery is required to have high performance and high power density. In addition, stable, efficient and fast charging technology is of crucial importance. Depending on arrangements, electric vehicle chargers can be divided into on-board chargers and ground chargers. A ground charger may be a AC (Alternating Current) charger, which charges a power battery assembly of an electric vehicle in a AC charging mode. A ground charger may be a DC (Direct Current) charger as well, which charges a power battery assembly of an electric vehicle in a DC charging mode. More often, the ground charger is a DC charger, so the DC charger is taken as an example in the disclosure. Output voltages and currents of the ground chargers have a large regulation range, and can provide several hundred kilowatts of charging power, which can realize fast charging of electric vehicles.

A ground charger of an electric vehicle is generally a conductive high-power ground charger. A power converter of the ground charger comprises a single-phase or three-phase uncontrollable rectifying bridge and a DC/DC conversion circuit. The single-phase or three-phase uncontrollable rectifying bridge rectifies single-phase alternating current or three-phase alternating current into direct current, so as to obtain a DC bus voltage. The DC-DC conversion circuit converts the direct current into a power supply with controllable DC voltage and DC current for charging the battery. Since the DC-DC converter in post-stage is with a buck converter topology, the DC bus voltage is clamped at a high voltage level. The output voltages of the charger are various, but the power converter with two-stage structure cannot well serve in some ranges of the output voltages. For example, in the range of high output voltage, the control method of the two-stage structure is not flexible enough, and the power conversion efficiency of it is low.

Therefore, there is a demand for an improvement in the structure of a power converter in the charger used for an electric vehicle and a control method thereof.

SUMMARY

The present disclosure aims to provide an improved power converter of a two-stage topology and a control method thereof, in order to solve the problem that the control mode of the power converter in the ground charger of the electric vehicle is not flexible enough and the power conversion efficiency is low.

According to one aspect of the present disclosure, a method of controlling a power converter is provided, wherein the power converter includes a PFC rectifier module connected to an AC input of the power converter and a DC-DC converter module connected to the PFC rectifier module and an output of the power converter, and the method includes:

acquiring an output voltage of the power converter;

when the output voltage of the power converter is greater than or equal to a minimum limit value of a bus voltage output by the PFC rectifier module, controlling the DC-DC converter module to operate in a constant-on mode in which the DC-DC converter module does not perform voltage conversion, and controlling the PFC rectifier module to output the bus voltage which is adjusted according to the output voltage of the power converter; and when the output voltage of the power converter is less than the minimum limit value of the bus voltage output by the PFC rectifier module, controlling the DC-DC converter module to operate in a voltage-regulation mode in which the DC-DC converter module converts the bus voltage output by the PFC rectifier module into the output voltage of the power converter, and controlling the PFC rectifier module to output the bus voltage with a constant value.

According to an embodiment of the present disclosure, the DC-DC converter module is a BUCK converter module, the BUCK converter module includes a main switch, and when the DC-DC converter module operates in the constant-on mode, the main switch maintains being conducted and a duty cycle of a driving signal of the main switch is 1.

According to an embodiment of the present disclosure, the PFC rectifier module is a three-phase VIENNA PFC circuit, and the minimum limit value of the bus voltage output by the three-phase VIENNA PFC circuit is:

$$V_{in\_phase} \times 2\sqrt{2} + 10,$$

wherein $V_{in\_phase}$ is an effective value of an input phase voltage of the three-phase VIENNA PFC circuit.

According to an embodiment of the present disclosure, the BUCK converter module includes a first conversion circuit, a positive output terminal and a negative output terminal, and the first conversion circuit includes a first main switch and a first synchronous rectifying switch;

when the BUCK converter module operates in the constant-on mode, the first main switch maintains being conducted, a duty cycle of a driving signal of the first main switch is 1, and the first synchronous rectifying switch remains being non-conducted; and when the BUCK converter module operates in the voltage-regulation mode, a PWM control is performed on the first main switch, and the first synchronous rectifying switch and the first main switch are turned on complementarily, which regulates an output voltage of the BUCK converter module.

According to an embodiment of the present disclosure, the BUCK converter module further includes a second conversion circuit, the structure of which is identical to the first conversion circuit, and the second conversion circuit and the first conversion circuit are connected in series between the positive output terminal and the negative output terminal of the BUCK converter module.

According to an embodiment of the present disclosure, the BUCK converter module includes a plurality of the first conversion circuits, and the plurality of the first conversion circuits are connected in parallel; and when the BUCK converter module operates in the voltage-regulation mode, the plurality of the first conversion circuits are turned on in an interleaving manner.

According to an embodiment of the present disclosure, the BUCK converter module includes a plurality of the second conversion circuits, and the plurality of the second conversion circuits are connected in parallel;

when the BUCK converter module operates in a voltage-regulation mode, the plurality of the second conversion circuits are turned on in an interleaving manner; and the plurality of the second conversion circuit and the plurality of the first conversion circuit are connected in series between the positive output terminal and the negative output terminal of the BUCK converter module.

According to an embodiment of the present disclosure, the power converter is a non-isolated converter.

According to an embodiment of the present disclosure, the PFC rectifier module is a T-type three-level PFC circuit.

According to another aspect of the present disclosure, a power converter is provided, including an AC input, an output, a PFC rectifier module, DC-DC converter module, a positive DC bus and a negative DC bus, wherein the PFC rectifier module is connected to the AC input of the power converter, and the positive DC bus and the negative DC bus of the power converter;

the DC-DC converter module is connected to the positive DC bus, the negative DC bus and the output of the power converter, when the output voltage of the power converter is greater than or equal to a minimum limit value of the bus voltage output by the PFC rectifier module, the DC-DC converter module operates in a constant-on mode in which the DC-DC converter module does not perform voltage conversion, and the PFC rectifier module outputs the bus voltage which is adjusted according to the output voltage of the power converter; and when the output voltage of the power converter is less than the minimum limit value of the bus voltage output by the PFC rectifier module, the DC-DC converter module operates in a voltage-regulation mode in which the DC-DC converter module converts the bus voltage output by the PFC rectifier module into the output voltage of the power converter, and the PFC rectifier module outputs the bus voltage with a constant value.

According to an embodiment of the present disclosure, the DC-DC converter module is a BUCK converter module, the BUCK converter module includes a main switch, and when the DC-DC converter module operates in the constant-on mode, the main switch maintains being conducted and a duty cycle of a driving signal of the main switch is 1.

According to an embodiment of the present disclosure, the PFC rectifier module is a three-phase VIENNA PFC circuit, and the minimum limit value of the bus voltage output by the three-phase VIENNA PFC circuit is:

$$V_{in\_phase} \times 2\sqrt{2} + 10,$$

wherein $V_{in\_phase}$ is an effective value of an input phase voltage of the three-phase VIENNA PFC circuit.

According to an embodiment of the present disclosure, the BUCK converter module includes a first conversion circuit, a positive output terminal and a negative output terminal, the first conversion circuit includes a first main switch, a first synchronous rectifying switch, a first inductor and a first capacitor, one end of the first main switch is connected to the positive DC bus, the other end of the first switch is connected to the positive output terminal via the first inductor, and the first synchronous rectifying switch is connected in parallel to a first filter circuit composed of the first inductor and the first capacitor;

when the BUCK converter module operates in the constant-on mode, the first main switch maintains being conducted, a duty cycle of a driving signal of the first main switch is 1, and the first synchronous rectifying switch keeps non-conducted; and when the BUCK converter module operates in the voltage-regulation mode, a PWM control is performed on the first main switch, and the first synchronous rectifying switch and the first main switch are turned on complementarily, which regulates an output voltage of the BUCK converter module.

According to an embodiment of the present disclosure, the BUCK converter module further includes a second conversion circuit, the structure of which is identical to the first conversion circuit, and the second conversion circuit and the first conversion circuit is connected in series between the positive output terminal and the negative output terminal of the BUCK converter module.

According to an embodiment of the present disclosure, the BUCK converter module includes a plurality of the first conversion circuits, and the plurality of the first conversion circuits are connected in parallel; and when the BUCK converter module operates in the voltage-regulation mode, the plurality of the first conversion circuits are turned on in an interleaving manner.

According to an embodiment of the present disclosure, the BUCK converter module includes a plurality of the second conversion circuits, and the plurality of the second conversion circuits are connected in parallel;

when the BUCK converter module operates in a voltage-regulation mode, the plurality of the second conversion circuits are turned on in an interleaving manner; and the plurality of the second conversion circuit and the plurality of the first conversion circuit are connected in series between the positive output terminal and the negative output terminal of the BUCK converter module.

According to an embodiment of the present disclosure, the power converter is a non-isolated converter.

According to an embodiment of the present disclosure, the PFC rectifier module is a T-type three-level PFC circuit.

An improved power converter and a control method thereof according to an embodiment of the present disclosure, by sampling an output voltage of a power converter, and comparing the output voltage with a minimum limit value of an output bus voltage of the preceding-stage, and switching control strategy of the power converter according to the comparison result and changing the operation state of the post-stage converter, can improve the conversion efficiency of the power converter in a simpler and more efficient manner.

BRIEF DESCRIPTION OF THE DRAWINGS

The above and other features and advantages of the present disclosure will become more apparent from exemplary embodiments described in detail with reference to accompanying drawings.

DETAILED DESCRIPTION

Figure 1:
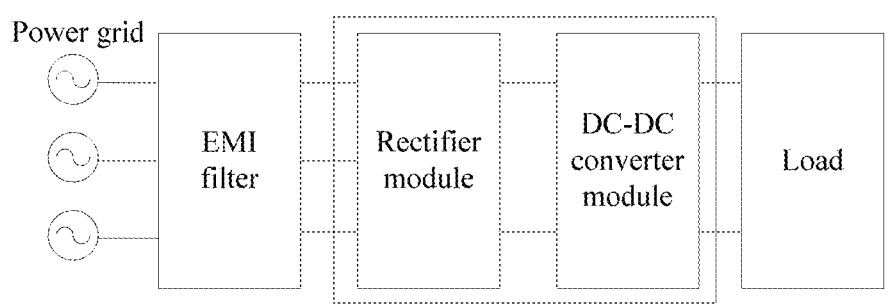
FIG. 1 is a block diagram illustrating a ground charger including a two-stage power converter in prior art.

Exemplary embodiments will now be described more fully with reference to the accompanying drawings. However, the exemplary embodiments can be embodied in a variety of forms, and should not be construed as being limited to the embodiments set forth herein. Rather, these embodiments are provided so that this disclosure will be thorough and complete, and the concept of the exemplary embodiments can be fully conveyed to those skilled in the art. In the drawings, sizes of some components may be exaggerated or modified for clarity. The same reference numerals in the drawings denote the same or similar structures, and thus their detailed description will be omitted.

Furthermore, the described features, structures, or characteristics may be combined in any suitable manner in one or more embodiments. In the following description, numerous specific details are set forth to provide a thorough understanding of the embodiments of the disclosure. However, those skilled in the art will appreciate that the technical solution of the present disclosure may be practiced without one or more of the specific details, or other methods, elements, and the like, may be employed. In other instances, well-known structures, methods, or operations are not shown or described in detail to avoid obscuring aspects of the present disclosure.

FIG. 1 shows a ground charger in prior art, a power converter of which has a two-stage structure. As shown in FIG. 1, an input power supply of the ground charger is three-phase alternating current, such as the power grid. The ground charger mainly includes an EMI (Electro Magnetic Interference) filter, a rectifier module and a DC-DC converter module. The EMI filter is configured to filter interference in the AC input from the power grid. The rectifier module is configured to convert AC power into DC power and output it on the DC bus. Generally, the rectifier module has a power factor correction (PFC) function as well. The DC-DC converter module converts the DC power on the DC bus into a DC output that can be used by the load. In the ground charger application, the power converter is mainly composed of a rectifier module and a DC-DC converter module, and the DC-DC converter module is generally configured to perform voltage-regulation, such as reducing voltage.

Figure 2:
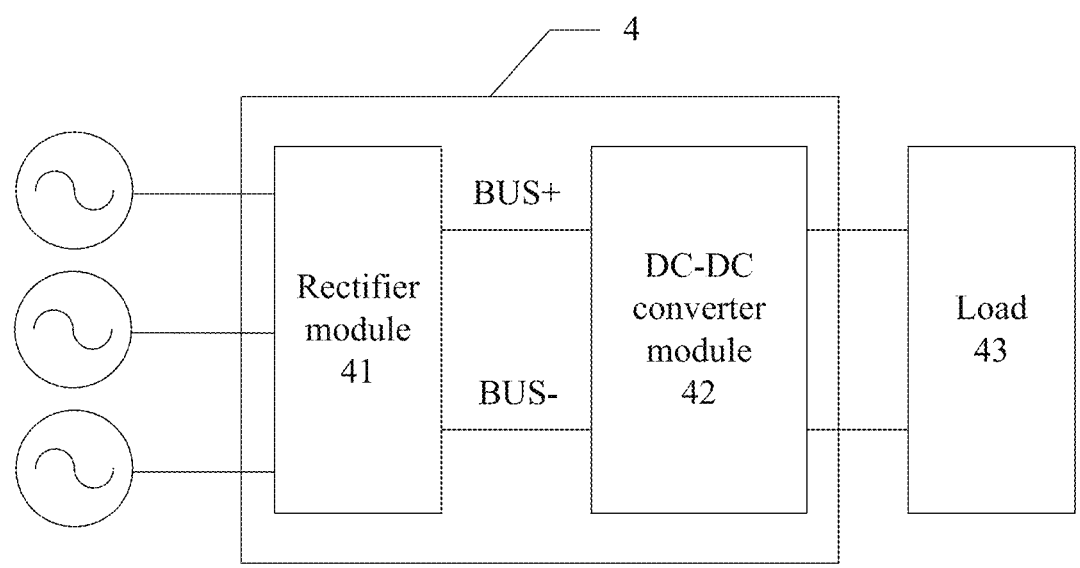
FIG. 2 is a block diagram illustrating a two-stage power converter according to an embodiment of the present disclosure.

FIG. 2 is a block diagram illustrating a power converter according to the present disclosure. As shown in FIG. 2, the power converter 4 includes a PFC rectifier module 41 and a DC-DC converter module 42. The power converter 4 receives an AC input and outputs DC power to a load 43 (such as an electric vehicle). The power converter 4 further has a positive DC bus BUS+ and a negative DC bus BUS−. The PFC rectifier module 41 is connected to the AC input of the power converter 4, the positive DC bus BUS+ and the negative DC bus BUS−. The DC-DC converter module 42 is connected to the positive DC bus BUS+, the negative DC bus BUS− and the output of the power converter 4.

Figure 3:
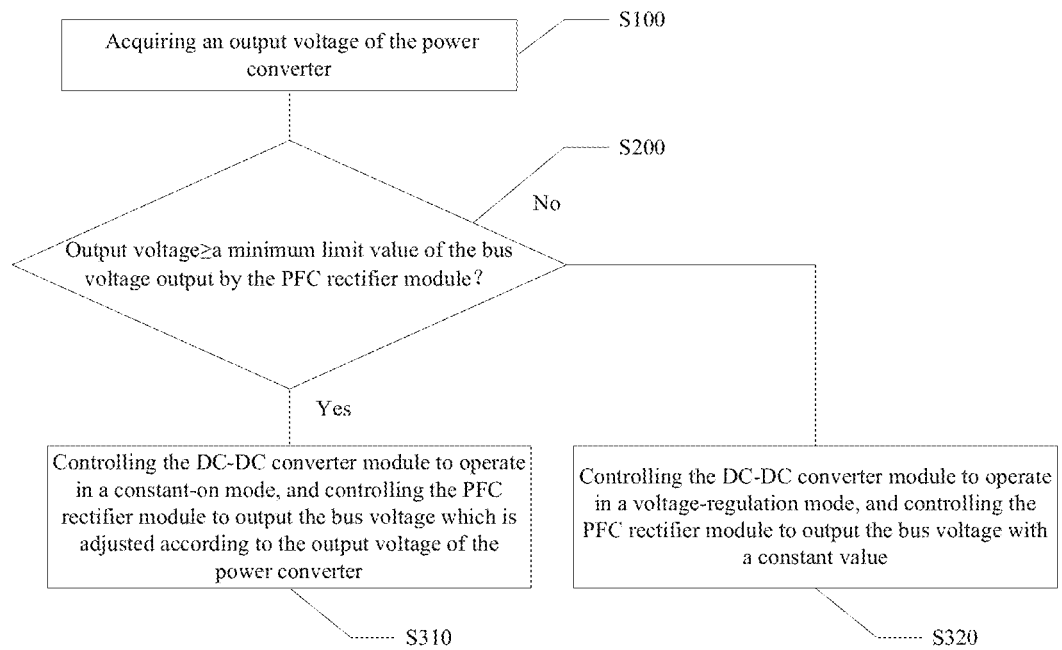
FIG. 3 is a flow chart illustrating a method of controlling a power converter according to the present disclosure.

FIG. 3 is a flow chart illustrating a method of controlling the power converter 4 in the present disclosure. In the actual operation process, the control strategy of the two-stage power converter includes the following steps.

In S100, an output voltage of the power converter is acquired.

In S200, it is determined whether the output voltage of the power converter is greater than or equal to a minimum limit value of a bus voltage output by the PFC rectifier module of the power converter.

According to the result of above comparison, the process proceeds to the following steps.

In S310: when the output voltage of the power converter is greater than or equal to the minimum limit value of the bus voltage output by the PFC rectifier module, the DC-DC converter module is controlled to operate in a constant-on mode in which the DC-DC converter module does not perform voltage conversion, and the PFC rectifier module outputs the bus voltage which is adjusted according to the output voltage of the power converter.

In S320, when the output voltage of the power converter is less than the minimum limit value of the bus voltage output by the PFC rectifier module, the DC-DC converter module is controlled to operate in a voltage-regulation mode in which the DC-DC converter module converts the bus voltage output by the PFC rectifier module into the output voltage of the power converter, and the bus voltage output by the PFC rectifier module is a constant value.

Figure 4:
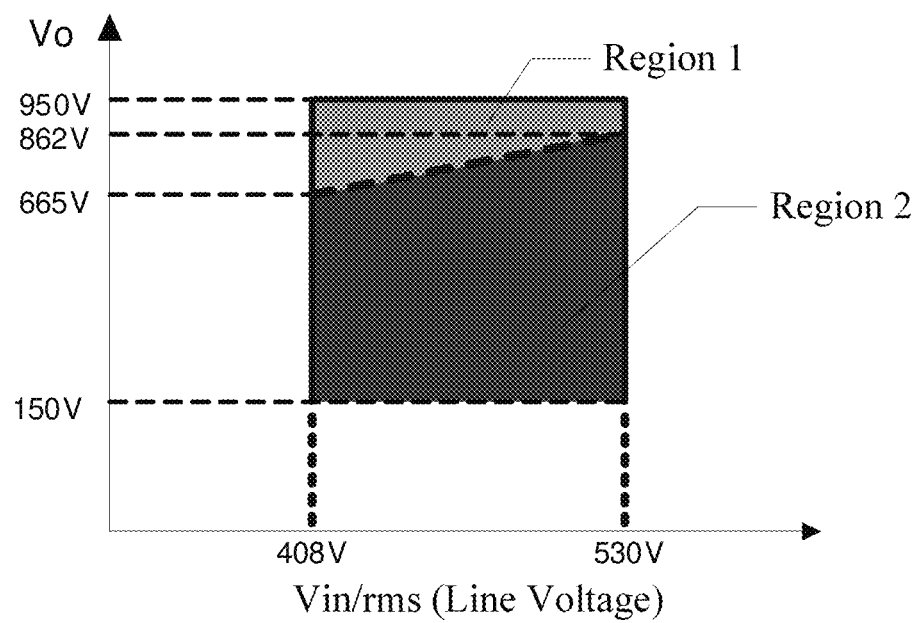
FIG. 4 is a graph illustrating an output voltage range of a power converter according to an embodiment of the present disclosure.

Please refer to FIG. 4 which shows the output voltage range of the power converter. In FIG. 4, the range of the input line voltage Vin is 408V-530V. In the region 1 of FIG. 4, the output voltage required by the power converter is higher than the minimum limit value (e.g., 665 V) of the bus voltage output by the preceding-stage PFC rectifier module, and the bus voltage output by the rectifier module is regulated according to the output voltage of the power converter (referred to as operation state 1). In the operation state 1, the output voltage of the power converter is directly controlled by the preceding-stage PFC rectifier module, and the post-stage DC-DC converter module does not perform voltage conversion, that is, the conversion of the post-stage DC-DC converter module is bypassed. In the operation state 1, only the preceding-stage PFC rectifier module performs power conversion, the entire power converter substantially operates in a single-stage mode, and the overall efficiency of the power converter can be improved.

In the region 2 of FIG. 4, the output voltage required by the power converter is less than the minimum limit value (e.g., 665 V) of the bus voltage output by the preceding-stage PFC rectifier module, the required output voltage of the power converter cannot be satisfied merely by the preceding-stage PFC rectifier module. In this case, the intermediate-bus voltage output by the preceding-stage PFC rectifier module is controlled to be at a certain fixed value, and the post-stage DC-DC converter module normally operates in a voltage-regulation mode (referred to as operation state 2, generally a voltage reducing mode). In the operation state 2, the power converter operates in a two-stage mode.

Figure 5:
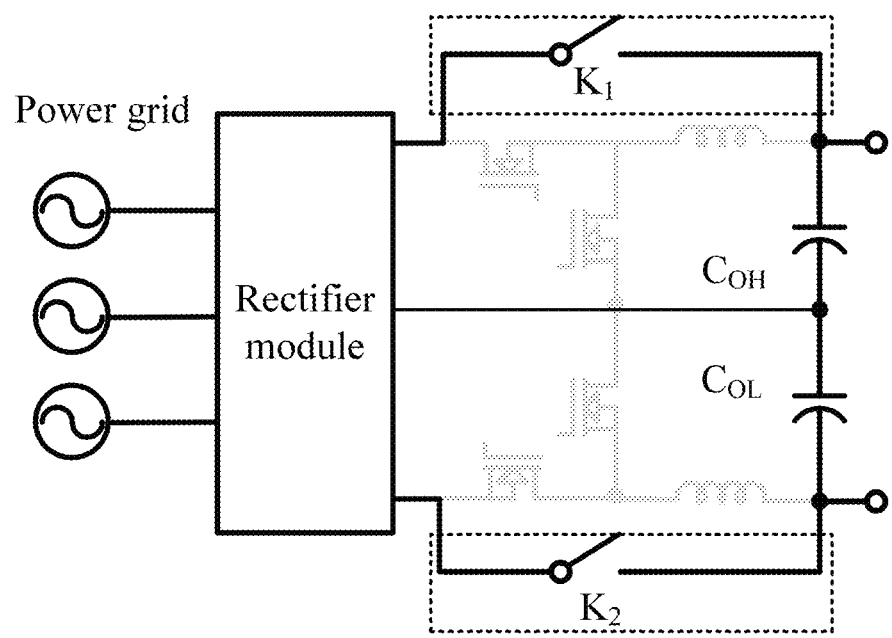
FIG. 5 is a schematic diagram illustrating a conventional bypass of a DC-DC converter module in prior art.

For the switching of the operation state, in a conventional method, additional switching elements are generally provided to bypass the entire DC-DC converter module. Referring to the bypass diagram of the DC-DC converter module in prior art shown in FIG. 5, the post-stage DC-DC converter module is bypassed by power switches (or relays) $K_1$ and $K_2$. However, since this method of bypassing the converter module with power switches or relays adds extra power devices to the circuit, the volume and weight of the system is increased, and the cost is increased. By contrast, according to the control strategy proposed by the present disclosure, by controlling the switching elements in the power converter, the preceding-stage rectifier module and the post-stage converter module can be switched between the operation states 1 and 2 without additional power devices.

The present disclosure proposes an improved control strategy for a power converter in two-stage topology. The strategy optimizes the system conversion efficiency of the power converter by switching the control mode of the power converter under different conditions. Specifically, the control strategy is that the output voltage of the power converter is sampled, and the control mode of the power converter is switched according to the range within which the output voltage of the power converter falls, thereby optimizing the system efficiency.

Since the preceding-stage PFC rectifier module has a voltage-regulation function, when the required output voltage of the power converter is high and falls within the regulation range of the output voltage of the PFC rectifier module, the PFC rectifier module can directly control the output voltage of the power converter and the DC-DC converter module stops performing the function of voltage reducing. The DC-DC converter module operates in the constant-on mode. Compared with the conventional two-stage power converter control method, the control strategy of the present disclosure can reduce switching loss and choke-core loss of the post-stage DC-DC converter module, further improving the system efficiency.

Figure 6:
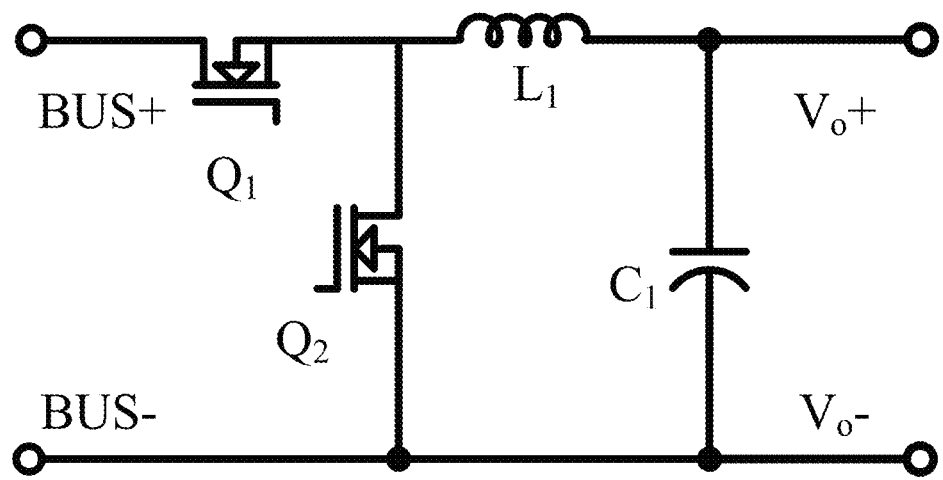
FIG. 6 is a schematic diagram of a DC-DC converter module being a BUCK converter module according to the present disclosure.

FIG. 6 is a schematic diagram of the DC-DC converter module according to the present disclosure, which is a voltage reducing (BUCK) converter module. The input of the BUCK converter module is from the DC bus voltage output by the preceding-stage PFC rectifier module. $Q_1$ is a main switch and $Q_2$ is a synchronous rectifying switch. One end of $Q_1$ is connected to the positive DC bus BUS+, and the other end is connected to the positive output terminal $V_0$+ of the BUCK converter module (i.e. the DC-DC converter module) via a filter inductor $L_1$. $Q_2$ is connected in parallel to the ends of the LC filter circuit composed of the inductor $L_1$ and the capacitor $C_1$. The capacitor $C_1$ is connected in series between the positive output terminal $V_0$+ and the negative output terminal $V_0$− of the BUCK converter module. When the DC-DC converter module operates in the voltage-regulation mode, the BUCK converter module performs a closed-loop control by sampling the output voltage of the power converter and the current of the filter inductor $L_1$, to output a driving signal of the main switch $Q_1$ which adjusts the duty cycle of the main switch $Q_1$. The synchronous rectifying switch $Q_2$ and the main switch $Q_1$ are turned on complementarily, so it is necessary to appropriately arrange a dead zone so as to avoid shoot-through. $Q_1$ and $Q_2$ are both controlled switches, such as IGBTs (Insulated Gate Bipolar Transistors) and MOSFETs (Metal Oxide Semiconductor Field Effect Transistors), or the like. When the DC-DC converter module operates in the constant-on mode, the main switch $Q_1$ is constantly conducted, and the synchronous rectifying switch $Q_2$ keeps non-conducted. Then the BUCK converter module no longer performs voltage conversion, and is equivalent to one stage of LC filter. At this time, the input voltage of the BUCK converter module is equal to the output voltage of the BUCK converter. It should be noted that the topology of the BUCK converter module of this embodiment is merely illustrative and is not intended to limit the present disclosure. For example, the synchronous rectifying switch $Q_2$ in FIG. 6 may be replaced by a diode.

Figure 7:
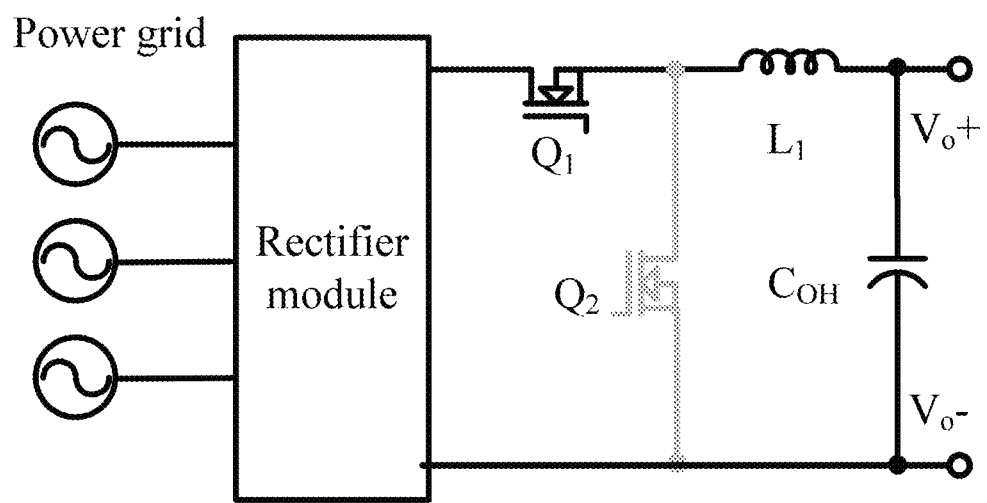
FIGS. 7 and 8 are schematic diagrams respectively showing equivalent circuit topologies of a DC-DC converter module in different operation conditions according to the present disclosure.
Figure 8:
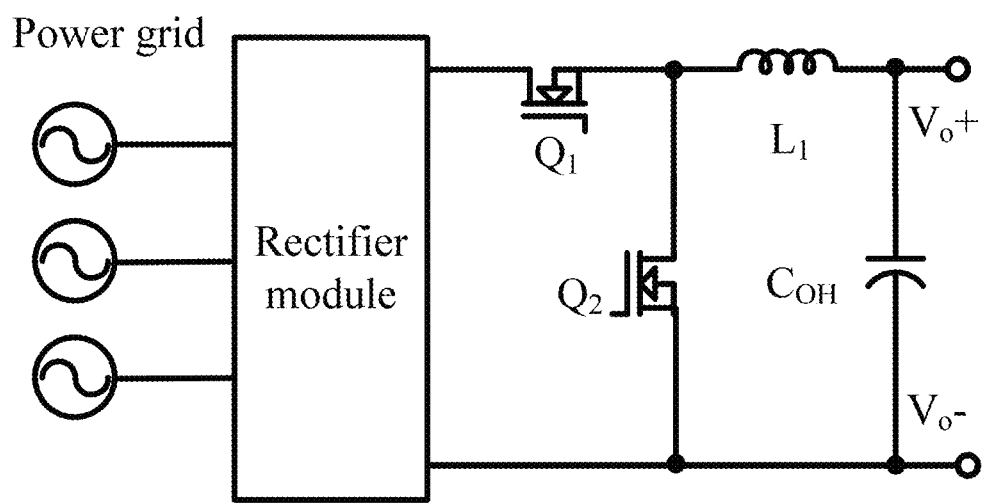

FIGS. 7 and 8 are schematic diagrams respectively showing equivalent circuit topologies of a DC-DC converter module in two operation conditions according to the present disclosure. As shown in FIGS. 7 and 8, when the post-stage BUCK converter module operates in the constant-on mode, the BUCK converter module samples the output voltage and output current of the power converter but does not perform voltage conversion and regulation. The main switch $Q_1$ of the BUCK converter module maintains being conducted at a 100% duty cycle, the synchronous rectifying switch $Q_2$ remains being non-conducted, so the BUCK converter module is equivalent to one stage of LC filter. The duty cycle of the driving signal of the main switch $Q_1$ is 1. When the post-stage BUCK converter module normally operates in the voltage-regulation mode (in this example, being the voltage reducing mode), the output voltage and the output current of the BUCK converter module are controlled in a closed loop to obtain a drive signal of the switch which performs PWM (Pulse Width Modulation) control on the main switch $Q_1$, and the synchronous rectifying switch $Q_2$ and the main switch $Q_1$ are complementarily conducted. As a result, the output voltage of the BUCK converter module can be regulated by controlling the duty cycle of the main switch $Q_1$.

Figure 9:
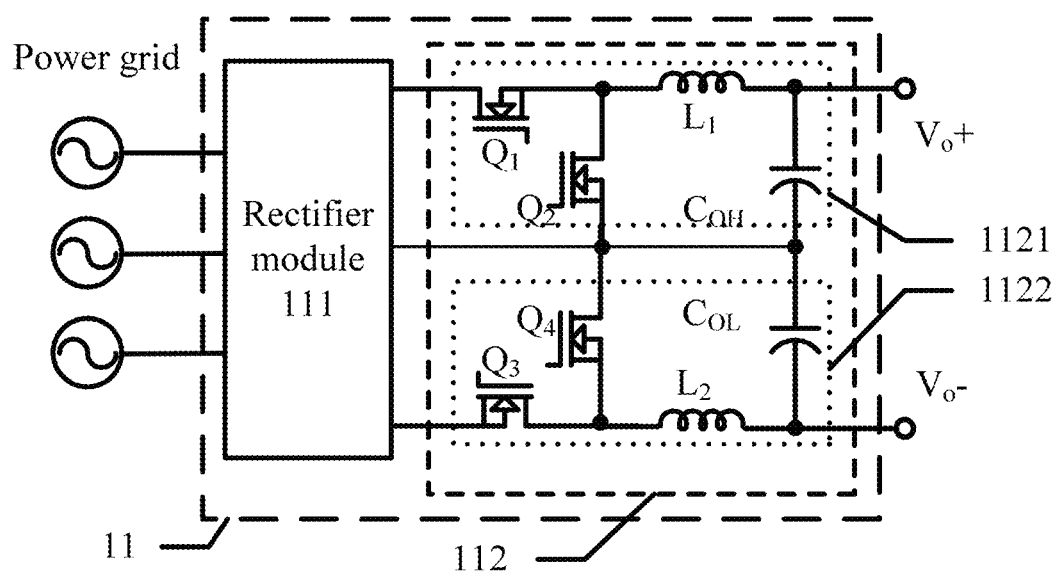
FIG. 9 is a schematic diagram of a BUCK converter module of a power converter according to an embodiment of the present disclosure.

FIG. 9 is a schematic diagram of a BUCK converter module of a power converter according to another embodiment of the present disclosure. As shown in FIG. 9, the power converter 11 includes a preceding-stage PFC rectifier module 111 and a post-stage DC-DC converter module, and the post-stage DC-DC converter module is the BUCK converter module 112. The BUCK converter module 112 includes a first conversion circuit 1121, a second conversion circuit 1122, a positive output terminal $V_0$+, and a negative output terminal $V_0$−. The positive output terminal $V_0$+ and the negative output terminal $V_0$− are the output terminals of the power converter 11 as well. The first conversion circuit 1121 and the second conversion circuit 1122 are identical in structure and connected in series between the positive output terminal $V_0$+ and the negative output terminal $V_0$− of the BUCK converter module 112. The main switch $Q_1$ of the first conversion circuit 1121 has one end connected to the positive DC bus of the output of the rectifier module 111, and the other end connected to the positive output terminal $V_0$+ of the BUCK conversion circuit 112 via the filter inductor $L_1$. The synchronous rectifying switch $Q_2$ is connected in parallel to the LC filter circuit composed of the filter inductor $L_1$ and the output capacitor $C_{OH}$. The main switch $Q_3$ of the second conversion circuit 1122 has one end connected to the negative DC bus of the output of the rectifier module 111, and the other end connected to the negative output terminal $V_0$− of the BUCK converter circuit 112 via the filter inductor $L_2$. The synchronous rectifying switch $Q_4$ is connected in parallel to the LC filter circuit composed of the filter inductor $L_2$ and the output capacitor $C_{OL}$. In addition, the connection point between the output capacitors $C_{OH}$ and $C_{OL}$ can be connected to the neutral point of the output of the preceding-stage rectifier module 111. In this embodiment, the main switches $Q_1$ and $Q_3$ and the synchronous rectifying switches $Q_2$ and $Q_4$ are all controlled switches, but the present disclosure is not limited thereto.

Through this series structure, the output voltage of the DC-DC converter module can be increased to meet the requirements of different loads, and the voltage on the components can be reduced so as to prolong the life of the device.

When the BUCK converter module 112 operates in the constant-on mode, the main switches $Q_1$ and $Q_3$ remain being conducted at a 100% duty cycle, and the synchronous rectifying switches $Q_2$ and $Q_4$ remain being non-conducted. The duty cycles of the driving signals of the main switches $Q_1$ and $Q_3$ are 1. When the BUCK converter module 112 operates in the voltage-regulation mode, the PWM control is performed on the main switches $Q_1$ and $Q_3$, the synchronous rectifying switch $Q_2$ and the main switch $Q_1$ are complementarily turned on, and the synchronous rectifying switch $Q_4$ and the main switch $Q_3$ are complementarily turned on, to regulate the output voltage of the BUCK converter module 112.

In addition, according to an embodiment of the present disclosure, at least one of the above-described first conversion circuit and second conversion circuit may be constituted by a plurality of conversion circuits in parallel. When the BUCK converter module 112 operates in the voltage-regulation mode, the plurality of conversion circuits in the first conversion circuit and/or in the second conversion circuit are turned on in an interleaving manner. An interleaved parallel structure is formed by the plurality of conversion circuits, and the plurality of conversion circuits are turned on in the interleaving manner, which can effectively reduce the ripple in the output of the power converter 11, and improve the efficiency of the power converter 11.

According to the power converter in various embodiments of the present disclosure, the preceding-stage uses the PFC rectifier module to obtain the intermediate-DC bus voltage, the post-stage uses the DC-DC converter module to obtain the output voltage within a wide range, and the control mode of the power converter may be switched according to the output voltage of the power converter. For the power converter with this two-stage structure, the control strategy proposed in this disclosure can be adopted.

Figure 10:
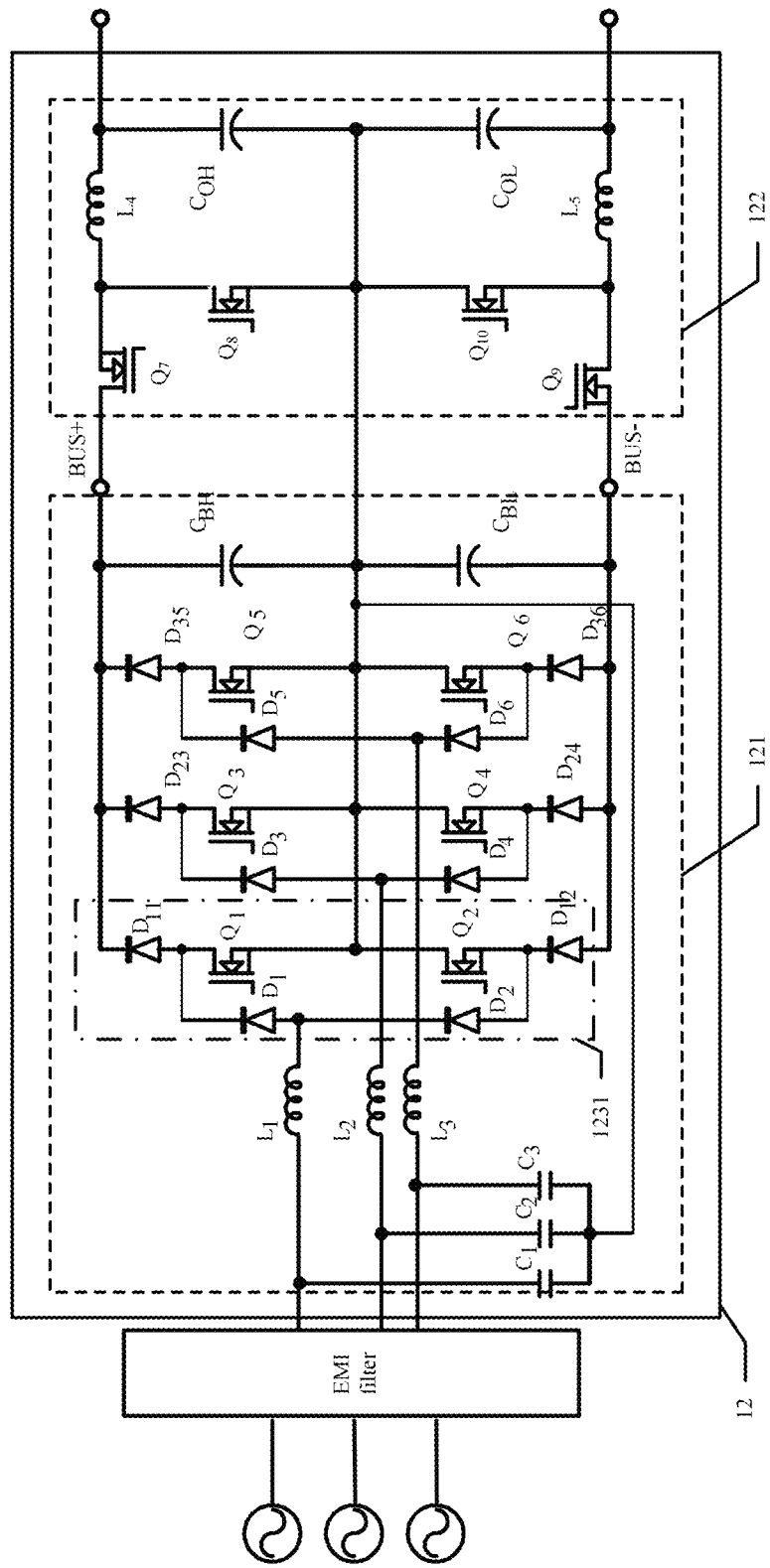
FIG. 10 is a schematic diagram of a two-stage power converter according to an embodiment of the present disclosure.

FIG. 10 is a schematic diagram of a two-stage power converter according to an embodiment of the present disclosure. AC power from the power grid is filtered by the EMI filter, and the AC power filtered is used as the input of the power converter 12. The preceding-stage PFC rectifier module 121 of the power converter 12 uses a VIENNA PFC circuit which converts the three-phase AC input into a DC output on the positive DC bus BUS+ and the negative DC bus BUS−. The post-stage DC-DC converter module 122 of the power converter 12 adopts a BUCK converter module, and the BUCK converter module is similar to that in FIG. 9. Please refer to FIG. 9, and details thereof are not described herein again. The circuit topology shown in FIG. 10 has a number of advantages such as, low voltage stress of power devices, low current harmonic content, and easy implementation of high power density, which is not limited thereto.

The PFC rectifier module 121 can be composed of a three-phase three-line VIENNA PFC circuit, with a three-phase AC power input. The VIENNA PFC circuit can convert the input AC current into a sine wave current. As a result, the harmonics of the power converter 12 caused by itself is reduced and the noise from the power grid is reduced as well. The PFC circuit shown in FIG. 10 has a three-level structure. In the PFC circuit shown in FIG. 10, energy can only flow in one direction, and there is no risk of switch shoot-through. It should be contemplated by those skilled in the art that other types of PFC circuits (e.g., three-phase four-line VIENNA PFC circuits) can be used as rectifier modules for the power converter 12 as well, and the control method thereof is similar to that in this example.

Taking the one-phase rectifying bridge circuit of the VIENNA PFC circuit as an example, as shown by the dotted line block 1231 in FIG. 10, when the switches $Q_1$ and $Q_2$ in the rectifying bridge circuit are all turned off, the rectifying bridge circuit becomes an uncontrolled rectifying bridge. Similarly, when the switches in three rectifying bridge circuits are all turned off, the VIENNA PFC circuit is equivalent to an uncontrolled rectifier circuit. At this time, the bus voltage output by the VIENNA PFC circuit on the positive DC bus BUS+ and the negative DC bus BUS− is the minimum limit value of the bus voltage output by the preceding-stage three-phase three-line VIENNA PFC circuit of the power converter 12 under controlled conditions. This minimum limit value can be expressed as:

$$V = V_{in\_phase} \times 2\sqrt{2} + 10,$$

wherein, $V_{in\_phase}$ is the effective value of the input phase voltage of the three-phase three-line VIENNA PFC circuit. The minimum limit value of the above bus voltage is compared with the output voltage of the power converter 12 required for the load, to determine whether or not to switch the system control strategy.

According to the control strategy, the control of the preceding-stage of the power converter is separate from the control of the post-stage of the power converter. The input three-phase alternating current is rectified by the preceding-stage VIENNA PFC circuit, and the DC bus voltage output by the PFC rectifier module 121 is controlled to be a certain preset value to provide a stable DC input voltage for the post-stage BUCK converter module 122. The post-stage BUCK converter module 122 generates the output voltage and output current of the power converter based on actual load demand The power converter with the two-stage structure can meet the requirements of wide-range output voltage. However, since the post-stage uses the BUCK converter module 122, the intermediate-DC bus voltage needs to be controlled at a higher voltage level. For different output voltage conditions of the power converter 12, the system conversion efficiency of the two-stage power converter 12 is low. The power converter 12 described above can effectively solve the above problems by using the control strategy of the present disclosure.

For the preceding-stage PFC rectifier module 121, when the output voltage of the power converter 12 is higher than or equal to the minimum limit value of the bus voltage that can be obtained by the closed-loop control to the preceding-stage PFC rectifier module 121, the voltage setting value output by the PFC circuit is regulated according to the output voltage of the power converter 12. At this time, the DC bus voltage output by the PFC rectifier module 121 is regulated according to the output voltage of the power converter, so that the output voltage of the power converter 12 is directly generated by the preceding-stage VIENNA PFC circuit and provided to the load. When the output voltage of the power converter 12 is less than the minimum limit value of the bus voltage that can be obtained by the closed-loop control on the preceding-stage PFC rectifier module 121, the required output voltage of the power converter cannot be obtained by directly controlling the preceding-stage PFC rectifier module 121. At this time, the bus voltage output by the PFC rectifier module 121 is controlled to be a certain preset value, and regardless of the load, the intermediate-DC bus voltage of the power converter 12 is always kept constant by regulating the output bus current.

Figure 11:
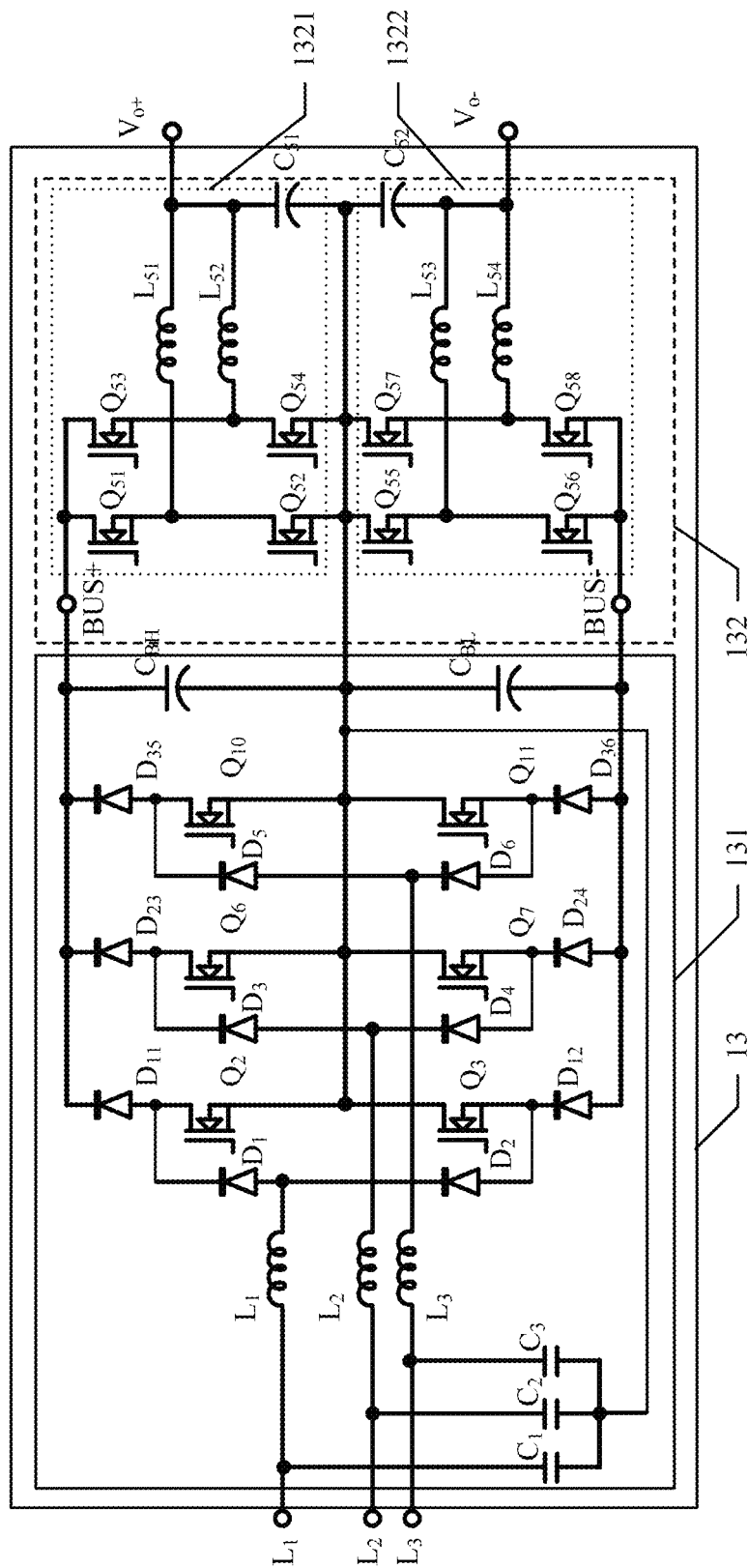
FIG. 11 is a schematic diagram of a two-stage power converter according to another embodiment of the present disclosure.

FIG. 11 is a schematic diagram of a two-stage power converter according to another embodiment of the present disclosure. As shown in FIG. 11, the two-stage power converter 13 includes a preceding-stage rectifier module 131 composed of a three-phase VIENNA PFC circuit and a post-stage DC-DC converter module 132 composed of interleaved parallel BUCK conversion circuits. Please refer to the description of FIG. 10 for the structure and function of the three-phase VIENNA PFC circuit, and details are not described herein again. The DC-DC converter module 132 includes a first interleaved parallel BUCK conversion circuit 1321, a second interleaved parallel BUCK conversion circuit 1322, a positive output terminal $V_O+$ and a negative output terminal $V_O-$. The positive output terminal $V_O+$ and the negative output terminal $V_O-$ are output terminals of the power converter 13 as well. The first interleaved parallel BUCK conversion circuit 1321 and the second interleaved parallel BUCK conversion circuit 1322 have the same structure, and are connected in series between the positive output terminal $V_O+$ and the negative output terminal $V_O-$. The first interleaved parallel BUCK conversion circuit 1321 is connected between the positive DC bus output BUS+ of the three-phase VIENNA PFC circuit and the neutral point, and includes a first branch and a second branch connected in parallel. The second interleaved parallel BUCK conversion circuit 1322 is connected between the negative DC bus output BUS− of the three-phase VIENNA PFC circuit and the neutral point, and includes a third branch and a fourth branch connected in parallel. The structures of the first branch, the second branch, the third branch and the fourth branch are the same as those of the BUCK converter module shown in FIG. 6, and are not described herein again. When the DC-DC converter module 132 operates in the constant-on mode, the main switches $Q_{51}$, $Q_{53}$, $Q_{56}$ and $Q_{58}$ maintain being conducted at a 100% duty cycle. The synchronous rectifying switches $Q_{52}$, $Q_{54}$, $Q_{55}$ and $Q_{57}$ remain being non-conducted. The duty cycles of the driving signals of the main switches $Q_{51}$, $Q_{53}$, $Q_{56}$ and $Q_{58}$ are 1. When the DC-DC converter module 132 operates in the voltage-regulation mode, the PWM controls are performed on the main switches $Q_{51}$, $Q_{53}$, $Q_{56}$ and $Q_{58}$, the synchronous rectifying switch $Q_{52}$ and the main switch $Q_{51}$ are complementarily turned on, the synchronous rectifying switch $Q_{54}$ and the main switch $Q_{53}$ are complementarily turned on, the synchronous rectifying switch $Q_{55}$ and the main switch $Q_{56}$ are complementarily turned on, and the synchronous rectifying switch $Q_{57}$ and the main switch $Q_{58}$ are complementarily turned on, to adjust the output voltage of DC-DC converter module 132. In addition, the first branch and the second branch are turned on in an interleaving manner, and the third branch and the fourth branch are turned on in the interleaving manner. The DC-DC converter module 132 adopts an interleaved parallel structure to effectively eliminate ripple interference in the output current of the power converter. The outputs of the first interleaved parallel BUCK conversion circuit 1321 and the second interleaved parallel BUCK conversion circuit 1322 are connected in series, which can provide an output voltage within a wide range.

The power converters of FIGS. 10 and 11 are both non-isolated power converter, and there is no isolation device between the preceding-stage PFC rectifier module and the post-stage DC-DC converter module. However, the control strategy proposed herein is not limited to the above non-isolated power converters.

Figure 12:
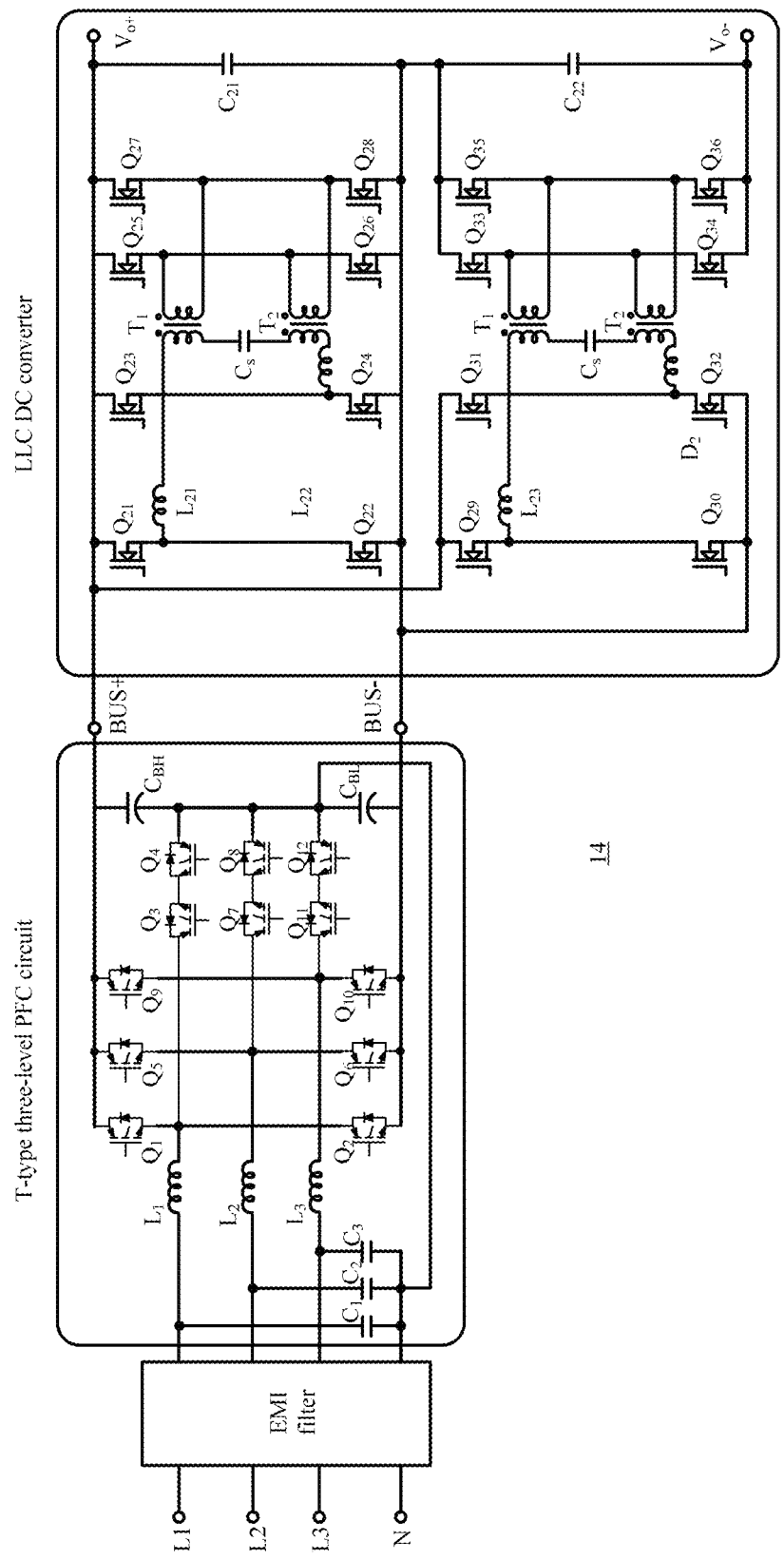
FIG. 12 is a schematic diagram of a two-stage power converter according to still another embodiment of the present disclosure.

FIG. 12 shows a circuit topology of a power converter according to still another embodiment of the present disclosure. The power converter 14 includes a preceding-stage rectifier module composed of a T-type three-level PFC circuit and a post-stage DC-DC converter module composed of LLC DC converters with an interleaved parallel structure. The two LLC DC converters are connected in parallel between the positive DC bus BUS+ and the negative DC bus BUS− of the T-type three-level PFC circuit, and the output capacitors $C_{21}$ and $C_{22}$ of the two LLC DC converters are connected in series between the positive output terminal $V_O+$ and the negative output terminal $V_O-$. According to the above control method, when the required output voltage of the power converter 14 is high, the intermediate-DC bus voltage can be adjusted by the preceding-stage PFC circuit, to directly obtain the output voltage of the power converter 14, which satisfies the requirement of the load. The post-stage LLC DC converters operate in a DCX (DC transformer) mode in which the LLC DC converters do not perform voltage conversion, and only functions as voltage isolation in power transfer. Thus, the overall efficiency of the power converter can be improved. When the required output voltage of the power converter 14 is low, the preceding-stage PFC circuit outputs a relatively high constant bus voltage, and the post-stage LLC converters generate the output voltage.

The present disclosure proposes the power converter and the control method thereof. In the control method, the output voltage of the power converter is sampled, and the output voltage is compared with the minimum limit value of the bus voltage output by the preceding-stage PFC rectifier module. According to the comparison result, the operating mode of the power converter is determined, that is, the operation modes of the post-stage DC-DC converter module are switched between the constant-on mode and the voltage-regulation mode. As a result, the conversion efficiency of the power converter can be improved in a simpler and more efficient manner without adding circuit components than that in prior art.

The present disclosure has been described by the above-described related embodiments, but the above embodiments are merely examples for implementing the present disclosure. It must be noted that the disclosed embodiments do not limit the scope of the disclosure. On the contrary, variations and modifications made without departing from the spirit and scope of the disclosure are within the scope of the disclosure.

What is claimed is:

1. A method of controlling a power converter, wherein the power converter comprises a PFC rectifier module connected to an AC input of the power converter and a DC-DC converter module connected to the PFC rectifier module and an output of the power converter, and the method comprises:
acquiring an output voltage of the power converter;
when the output voltage of the power converter is greater than or equal to a minimum limit value of a bus voltage output by the PFC rectifier module, controlling the DC-DC converter module to operate in a constant-on mode in which the DC-DC converter module does not perform voltage conversion, and controlling the PFC rectifier module to output the bus voltage which is adjusted according to the output voltage of the power converter; and when the output voltage of the power converter is less than the minimum limit value of the bus voltage output by the PFC rectifier module, controlling the DC-DC converter module to operate in a voltage-regulation mode in which the DC-DC converter module converts the bus voltage output by the PFC rectifier module into the output voltage of the power converter, and controlling the PFC rectifier module to output the bus voltage with a constant value.

2. The method of claim 1, wherein the DC-DC converter module is a BUCK converter module, the BUCK converter module comprises a main switch, and when the DC-DC converter module operates in the constant-on mode, the main switch maintains being conducted and a duty cycle of a driving signal of the main switch is 1.

3. The method according to claim 1, wherein the PFC rectifier module is a three-phase VIENNA PFC circuit, and the minimum limit value of the bus voltage output by the three-phase VIENNA PFC circuit is:

$$V_{in\_phase} \times 2\sqrt{2}+10,$$

wherein $V_{in\_phase}$ is an effective value of an input phase voltage of the three-phase VIENNA PFC circuit.

4. The method according to claim 2, wherein
the BUCK converter module comprises a first conversion circuit, a positive output terminal and a negative output terminal, and the first conversion circuit comprises a first main switch and a first synchronous rectifying switch;
when the BUCK converter module operates in the constant-on mode, the first main switch maintains being conducted, a duty cycle of a driving signal of the first main switch is 1, and the first synchronous rectifying switch remains being non-conducted; and
when the BUCK converter module operates in the voltage-regulation mode, a PWM control is performed on the first main switch, and the first synchronous rectifying switch and the first main switch are turned on complementarily, which regulates an output voltage of the BUCK converter module.

5. The method according to claim 4, wherein the BUCK converter module further comprises a second conversion circuit, the structure of which is identical to the first conversion circuit, and the second conversion circuit and the first conversion circuit are connected in series between the positive output terminal and the negative output terminal of the BUCK converter module.

6. The method according to claim 5, wherein
the BUCK converter module comprises a plurality of the first conversion circuits, and the plurality of the first conversion circuits are connected in parallel; and
when the BUCK converter module operates in the voltage-regulation mode, the plurality of the first conversion circuits are turned on in an interleaving manner.

7. The method according to claim 6, wherein
the BUCK converter module comprises a plurality of the second conversion circuits, and the plurality of the second conversion circuits are connected in parallel;
when the BUCK converter module operates in a voltage-regulation mode, the plurality of the second conversion circuits are turned on in an interleaving manner; and
the plurality of the second conversion circuit and the plurality of the first conversion circuit are connected in series between the positive output terminal and the negative output terminal of the BUCK converter module.

8. The method according to any one of claims 1, wherein the power converter is a non-isolated converter.

9. The method according to claim 1, wherein the PFC rectifier module is a T-type three-level PFC circuit.

10. A power converter, comprising a PFC rectifier module, a DC-DC converter module, a positive DC bus and a negative DC bus, wherein
the PFC rectifier module is connected to an AC input of the power converter, and the positive DC bus and the negative DC bus of the power converter;
the DC-DC converter module is connected to the positive DC bus, the negative DC bus and an output of the power converter,
when the output voltage of the power converter is greater than or equal to a minimum limit value of the bus voltage output by the PFC rectifier module, the DC-DC converter module operates in a constant-on mode in which the DC-DC converter module does not perform voltage conversion, and the PFC rectifier module outputs the bus voltage which is adjusted according to the output voltage of the power converter; and
when the output voltage of the power converter is less than the minimum limit value of the bus voltage output by the PFC rectifier module, the DC-DC converter module operates in a voltage-regulation mode in which the DC-DC converter module converts the bus voltage output by the PFC rectifier module into the output voltage of the power converter, and the PFC rectifier module outputs the bus voltage with a constant value.

11. The power converter according to claim 10, wherein the DC-DC converter module is a BUCK converter module, the BUCK converter module comprises a main switch, and when the DC-DC converter module operates in the constant-on mode, the main switch maintains being conducted and a duty cycle of a driving signal of the main switch is 1.

12. The power converter according to claim 10, wherein the PFC rectifier module is a three-phase VIENNA PFC circuit, and the minimum limit value of the bus voltage output by the three-phase VIENNA PFC circuit is:

$$V_{in\_phase} \times 2\sqrt{2}+10,$$

wherein $V_{in\_phase}$ is an effective value of an input phase voltage of the three-phase VIENNA PFC circuit.

13. The power converter according to claim 11, wherein
the BUCK converter module comprises a first conversion circuit, a positive output terminal and a negative output terminal, the first conversion circuit comprises a first main switch, a first synchronous rectifying switch, a first inductor and a first capacitor, one end of the first main switch is connected to the positive DC bus, the other end of the first switch is connected to the positive output terminal via the first inductor, and the first synchronous rectifying switch is connected in parallel to a first filter circuit composed of the first inductor and the first capacitor;
when the BUCK converter module operates in the constant-on mode, the first main switch maintains being conducted, a duty cycle of a driving signal of the first main switch is 1, and the first synchronous rectifying switch keeps non-conducted; and
when the BUCK converter module operates in the voltage-regulation mode, a PWM control is performed on the first main switch, and the first synchronous rectifying switch and the first main switch are turned on complementarily, which regulates an output voltage of the BUCK converter module.

14. The power converter according to claim 13, wherein the BUCK converter module further comprises a second conversion circuit, the structure of which is identical to the first conversion circuit, and the second conversion circuit and the first conversion circuit is connected in series between the positive output terminal and the negative output terminal of the BUCK converter module.

15. The power converter according to claim 14, wherein
the BUCK converter module comprises a plurality of the first conversion circuits, and the plurality of the first conversion circuits are connected in parallel; and
when the BUCK converter module operates in the voltage-regulation mode, the plurality of the first conversion circuits are turned on in an interleaving manner.

16. The method according to claim 15, wherein
the BUCK converter module comprises a plurality of the second conversion circuits, and the plurality of the second conversion circuits are connected in parallel;
when the BUCK converter module operates in a voltage-regulation mode, the plurality of the second conversion circuits are turned on in an interleaving manner; and
the plurality of the second conversion circuit and the plurality of the first conversion circuit are connected in series between the positive output terminal and the negative output terminal of the BUCK converter module.

17. The power converter according to any one of claims 10, wherein the power converter is a non-isolated converter.

18. The power converter according to claim 10, wherein the PFC rectifier module is a T-type three-level PFC circuit.

* * * * *